US008995454B2

(12) United States Patent
Hemli et al.

(10) Patent No.: US 8,995,454 B2
(45) Date of Patent: Mar. 31, 2015

(54) SYSTEM AND METHOD FOR HIGH THROUGHPUT COMMUNICATION IN A MESH HYBRID NETWORK

(75) Inventors: Ronel Hemli, Givat Shmuel (IL); Ofir Appelbaum, Givat Shmuel (IL)

(73) Assignee: Mobix Wireless Solutions Ltd., Petach Tikwa (IL)

( * ) Notice: Subject to any disclaimer, the term of this patent is extended or adjusted under 35 U.S.C. 154(b) by 435 days.

(21) Appl. No.: 13/004,320

(22) Filed: Jan. 11, 2011

(65) Prior Publication Data

US 2012/0177057 A1   Jul. 12, 2012

(51) Int. Cl.
*H04L 12/28* (2006.01)
*H04L 12/801* (2013.01)

(52) U.S. Cl.
CPC .............. *H04L 47/193* (2013.01); *H04L 47/14* (2013.01)
USPC ............................ 370/406; 370/238; 370/328

(58) Field of Classification Search
None
See application file for complete search history.

(56) References Cited

U.S. PATENT DOCUMENTS

| | | | | |
|---|---|---|---|---|
| 6,314,163 B1 * | 11/2001 | Acampora | ................... | 379/56.2 |
| 7,246,172 B2 | 7/2007 | Yoshiba et al. | | |
| 7,606,178 B2 * | 10/2009 | Rahman et al. | ............... | 370/256 |
| 7,660,315 B2 * | 2/2010 | Kodialam et al. | ............. | 370/400 |
| 7,660,318 B2 * | 2/2010 | Rahman et al. | ............... | 370/401 |
| 7,668,173 B2 * | 2/2010 | Zhao | ........................ | 370/395.21 |
| 7,746,879 B2 * | 6/2010 | Kangude et al. | ............. | 370/406 |
| 7,808,934 B2 | 10/2010 | Zhao et al. | | |
| 8,165,040 B2 * | 4/2012 | Yang et al. | ..................... | 370/255 |
| 8,223,658 B2 * | 7/2012 | Bahr | ............................ | 370/242 |
| 8,254,251 B2 * | 8/2012 | Hemli et al. | .................. | 370/228 |
| 8,351,369 B2 * | 1/2013 | Han et al. | ....................... | 370/322 |
| 8,380,072 B2 * | 2/2013 | Wang et al. | ..................... | 398/115 |
| 8,385,345 B2 * | 2/2013 | Ji et al. | ........................... | 370/394 |
| 8,467,297 B2 * | 6/2013 | Liu et al. | ........................ | 370/238 |
| 8,588,135 B2 * | 11/2013 | Wang et al. | ..................... | 370/328 |
| 8,780,920 B2 * | 7/2014 | Bahr et al. | ................. | 370/395.2 |
| 2007/0253465 A1 * | 11/2007 | Muharemovic et al. | ....... | 375/130 |
| 2008/0170550 A1 * | 7/2008 | Liu et al. | ........................ | 370/338 |
| 2009/0073921 A1 * | 3/2009 | Ji et al. | ........................... | 370/328 |
| 2009/0168796 A1 * | 7/2009 | Pandey et al. | ................. | 370/458 |
| 2010/0085948 A1 * | 4/2010 | Yu et al. | ........................ | 370/338 |
| 2010/0177753 A1 * | 7/2010 | Bahr | ............................ | 370/338 |
| 2010/0195498 A1 | 8/2010 | Hemli et al. | | |
| 2011/0194415 A1 * | 8/2011 | Bahr | ............................ | 370/242 |
| 2011/0199890 A1 * | 8/2011 | Sadan et al. | .................. | 370/216 |
| 2011/0228742 A1 * | 9/2011 | Honkasalo et al. | ........... | 370/330 |

OTHER PUBLICATIONS

International Search Report of International Application No. PCT/IL2012/000017 mailed on May 18, 2012.

* cited by examiner

*Primary Examiner* — Michael J Moore, Jr.
(74) *Attorney, Agent, or Firm* — Pearl Cohen Zedek Latzer Baratz LLP (57) ABSTRACT

System and method for increasing throughput and reducing the transmission delay in a hybrid mesh network. The hybrid mesh network including a plurality of physical mediums and a plurality of nodes linked over the plurality of physical mediums to form at least one route including a retransmitting node, linked over one physical medium with a preceding node and over other physical medium with a following node. The network is configured such that there is no link on anyone of the physical mediums between the preceding node and the following node, and each two nodes of the route with a link on one of the physical mediums do not have any links on the same physical medium with any other of nodes in the route. This enables the retransmitting node to start retransmitting a message received from the preceding node to the following node before completing receiving the message.

11 Claims, 5 Drawing Sheets

SYSTEM AND METHOD FOR HIGH THROUGHPUT COMMUNICATION IN A MESH HYBRID NETWORK

BACKGROUND OF THE INVENTION

In a mesh network a route between a source node and a destination node flows through retransmitting nodes. These retransmitting nodes take part in retransmitting the message sent from the source node to the destination node. When sending a message in a standard mesh network over a single physical medium each network node has to stop transmitting and release the physical medium to allow another unit to transmit over the same physical medium. This limitation may prevent collisions among messages sent from different nodes transmitting concurrently. Thus, a limiting factor in mesh networks is the number of times a message needs to be retransmitted (repeated) on its route from the source node to the destination node in the network. The delay of a single retransmission is a factor of the message length and the processing time of the network node and other parameters. The retransmitting nodes in the route may cause delay as they must complete receiving the message before they start resending it. This limitation causes delay that is substantially the multiplication of the number of retransmitting nodes by the retransmission time duration.

As a result, different nodes in the mesh network may have different access times depending of the number of retransmissions. Additionally, the average transmission delay between two nodes in a mesh network may increase with the number of nodes of the network by a factor of $LOG_X(N)$ where N is the number of nodes in the network and X is the average number of neighboring nodes (nodes with direct link) per node.

SUMMARY OF THE INVENTION

According to embodiments of the present invention there is provided hybrid mesh network, the network may include a plurality of physical mediums and a plurality of nodes linked over the physical mediums to form at least one ultimate throughput mesh hybrid (UTMH) route including a plurality of retransmitting nodes, linked over a first physical medium with a first node and over a second physical medium with a second node, wherein there may be no link on any of the physical mediums between the first node and the second node, and wherein two nodes of the UTMH route which are linked on one of the physical mediums may not have any links on the same physical medium with any other node in the UTMH route.

Furthermore, according to embodiments of the present invention, the retransmitting nodes may be configured to start retransmitting a message received from the first node over the first physical medium to the second node over the second physical medium before completing receiving the message.

Furthermore, according to embodiments of the present invention, the nodes may build a tree of the UTMH routes in the network based on topology of the network and on available links between the nodes in the physical mediums. Alternatively, a master device may build a tree of the UTMH routes in the network based on topology of the network and on available links between the nodes in the physical mediums and may communicate data indicative of the tree to the nodes.

Furthermore, according to embodiments of the present invention, the routes may be calculated by assigning a weight of 1 to links in the UTMH routes, assigning a weight equivalent to average message length to other links in the network, and solving a single-source shortest route problem for a graph with nonnegative edge route costs.

Furthermore, according to embodiments of the present invention, there is provided a node in a hybrid mesh network, the node may include a physical layer connected to a plurality of physical mediums, and a data link layer connected to the physical layer, wherein the physical layer and the data link layer may be configured to start retransmitting a message received over one of the physical mediums over other physical medium before completing receiving the message.

Furthermore, according to embodiments of the present invention, there is provided a method for high throughput communication in a mesh hybrid network. The method may include linking a plurality of retransmitting nodes over a first physical medium with a first node and over a second physical medium with a second node to form a ultimate throughput mesh hybrid (UTMH) route, wherein there is no link on any of the physical mediums between the first node and the second node, and wherein two nodes of the UTMH route with a link on one of said physical mediums may not have any links on the same physical medium with any other of the nodes in the UTMH route.

Furthermore, according to embodiments of the present invention, the method may include start retransmitting a message received from the first node over the first physical medium to the second node over the second physical medium before completing receiving the message.

Furthermore, according to embodiments of the present invention, the method may include building a tree of the UTMH routes in the network based on topology of the network and on available links between the nodes in the physical mediums, and communicating data indicative of the tree to the nodes.

Furthermore, according to embodiments of the present invention, the method may include assigning a weight of 1 to links in the UTMH route, assigning a weight equivalent to average message length to other links in the network, and solving a single-source shortest route problem for a graph with nonnegative edge route costs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

A mesh communication system may typically include repeating or retransmitting node or nodes in order to cover a predefined area or a predefined group of network nodes with alternative paths of communication. Since each node has communication capabilities inherently, it is possible to use each node as a repeater which may communicate data and/or content.

Typical mesh networks may include a single physical medium to deliver the data. A hybrid mesh network according to embodiments of the present invention may include more than one physical medium, as described in patent application Ser. No. 12/364,727 which is incorporated herein by reference in its entirety. A hybrid mesh network may deliver data over a plurality of physical mediums. For example, a hybrid mesh network may deliver data over two separate physical mediums, such as, but not limited to, power line communication (PLC) and radio frequency (RF) physical mediums. According to embodiments of the present invention, there may not necessarily be a physical link between each pair of nodes on neither of the physical mediums. For example, in a hybrid mesh network having two physical mediums, each pair of nodes may have a physical link on the first medium only, on the second medium only or on both.

According to embodiments of the present invention, in a hybrid mesh network each of the network nodes, or end units, may be interconnected with one or more other end units of the mesh network over one or more physical mediums. The interconnection, in each of the physical mediums may be achieved through a dedicated connection between each of the nodes or through a shared physical medium.

In some shared physical mediums the quality and strength of the physical connection between each pair of nodes may not be constant. The quality and strength may depend on dynamic environmental and physical conditions such as, for example, the distance between nodes, external interferences, other nodes transmitting on the same medium etc. In cases where the quality and strength of the physical connection among a group of nodes connected to a shared medium is good, collision can occur if the colliding nodes are transmitting at the same time. However, some nodes transmitting on a shared physical medium may not be able to communicate with some of the other nodes sharing the same medium if the external and physical situation provides isolation between the different communicating areas. Thus, several communications can take place on the shared physical medium with no collision if the external and physical situation provides isolation between the different communicating areas. This attribute can be exploited for reuse of the shared media simultaneously where it is possible. An example for such a system is a cellular wireless network where the same RF channel can be used simultaneously by different nodes if the nodes are located in isolated cells.

Figure 1:
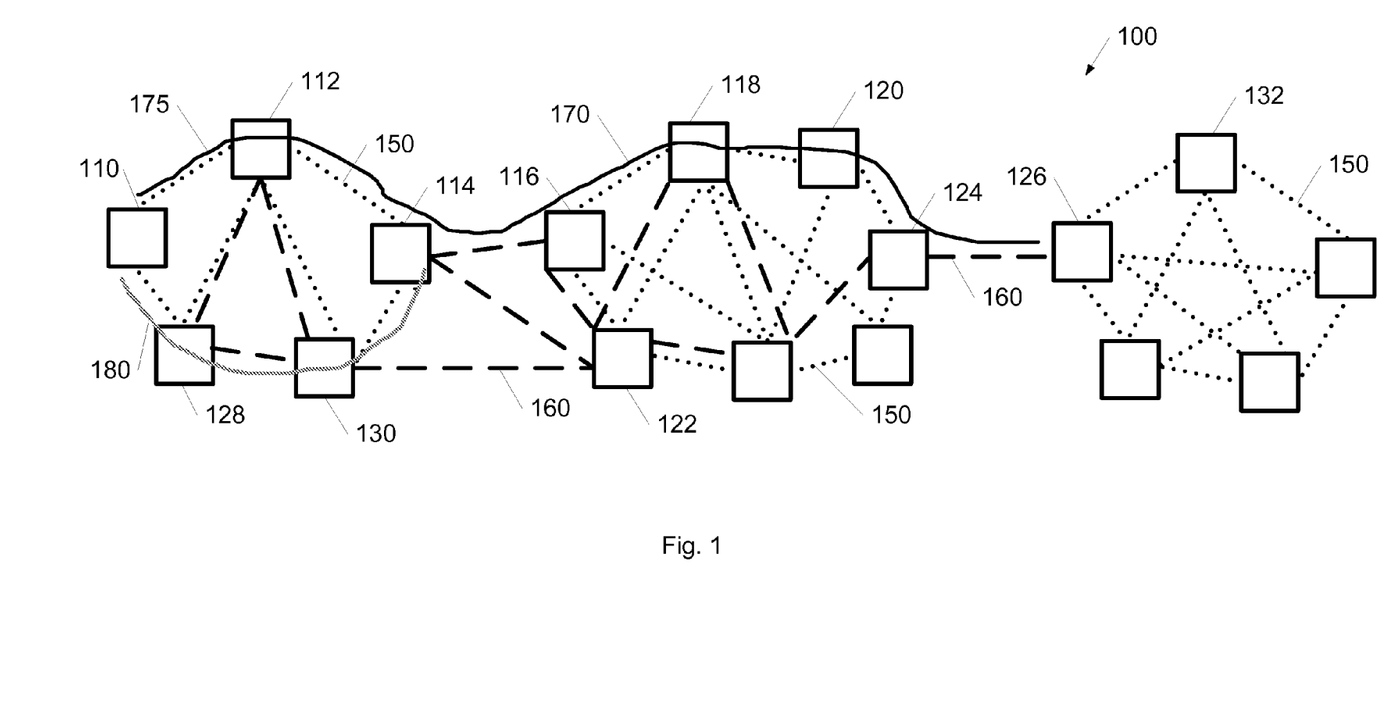
FIG. 1 is a schematic diagram illustrating an exemplary topology of mesh hybrid network according to embodiments of the invention.

Reference is made to FIG. 1 depicting a schematic diagram illustrating an exemplary topology of mesh hybrid network 100 according to embodiments of the invention. According to embodiments of the invention, network 100 may comprise a plurality of nodes 110, 112, 114, 116, 118, 120, 122, 124, 126, 128, 130 and 132 and at least two physical mediums 150, presented by a dotted line and 160, presented by a dashed line. At least some nodes 112, 114, 116, 118, 122, 124, 126, 128 and 130 may be adapted to communicate via at least two physical mediums 150 and 160.

A message sent from node 110 to node 126 may follow route 170 through nodes 112, 114, 116, 118, 120 and 124. Accordingly, node 110 may function as a source node, node 126 may function as a destination node, and nodes 112, 114, 116, 118, 120 and 124 may function as retransmitting nodes. It would be apparent to a person skilled in the art of the invention that alternative routes connecting node 110 to node 126 may exist. For example, a message sent from node 110 may reach node 126 via nodes 112, 114, 122, 118, 120, 124 and 126.

Since according to the example presented in FIG. 1 nodes 110, 112 and 114 may be interconnected via a single physical medium 150, retransmitting node 112 may have to complete receiving the message before node 112 may be able to start resending the message. However, as retransmitting node 114 may be connected to retransmitting node 116 on a different physical medium 160, node 114 may start retransmitting the message before node 114 completes receiving the message. The minimum theoretical delay in this scenario may be the time required by node 114 for the reception and retransmission of a single bit. The minimum practical delay for the retransmission of the first bit in a message may also include link access delay. The time required for the reception and retransmission of a single bit will be referred hereinafter as a single bit delay. Node 114 may retransmit the message with substantially a single bit delay since when the first bit of the message is retransmitted, the rest of the links on the route ahead may be substantially clear, and substantially no other bits may run simultaneously. Node 116 may retransmit the message received from node 114 to retransmitting node 118 with a single bit delay as nodes 114 and 116 are interconnected via physical medium 160 and nodes 116 and 118 are connected via a different physical medium 150. Retransmitting node 118 may have to complete receiving the message from node 116 before node 118 start resending the message to node 120 as nodes 116, 118 and 120 may be interconnected over a single physical medium 150. Similarly, node 120 may have to complete receiving the message from node 118 before node 120 start resending the message to node 124 as nodes 118, 120 and 124 are interconnected over a single physical medium 150. Node 124 may retransmit the message received from node 120 to node 126 with a single bit delay as nodes 120 and 124 are interconnected via physical medium 150 and nodes 124 and 126 are interconnected via a different physical medium 160.

According to embodiments of the invention, the network nodes may comprise a physical layer connected to the plurality of physical mediums and a data link layer connected to the physical layer. The retransmitting of a message received over a one physical medium over a different physical medium, before completing receiving the message, may be done by the physical layer and data link layer of the network node and therefore may substantially not involve additional processing by the repeating node, as described in detail in U.S. patent application Ser. No. 12/364,727.

The working mode of a hybrid mesh network, in which at least one retransmitting node is configured to retransmit messages utilizing the advantage of having a plurality of physical mediums with a single bit delay may be referred to as improved throughput mesh hybrid (ITMH) mode hereinafter. The working mode of a hybrid mesh network, in which all retransmitting nodes in all predefined routes are configured to retransmit messages with a single bit delay, may be referred to as ultimate throughput mesh hybrid (UTMH) mode hereinafter. It should be noted that the predefined routes in a UTMH mode may all originate or end in a single node of the network.

In order to establish ITMH mode or UTMH mode, dedicated routes for connecting source nodes to destination nodes may be identified. The routes may be predefined and may dictate which specific nodes take part in the routes in order to avoid collision on the plurality of physical mediums.

In an implementation of a mesh hybrid network 100 according to embodiments of the present invention, one node may be defined as a master device 132. Master device 132 may build the communication paths or routes in the network based on the network topology and available interconnection paths between nodes in the different physical mediums. These paths or routes topology can be described as a tree. This tree may be used by all other nodes in the mesh hybrid network as the default paths topology. In case a connection is declared down or broken, master device 132 may rebuild the tree of the communication paths to cover or compensate for the broken connection.

According to embodiments of the invention, network 100 may implement at least one additional communication mode, such as, but not limited to, standard point to point, multicast, broadcast and the like, for control and configuration of routes. This communication mode, referred to herein after as control and configuration mode, may be used by master device 132 to communicate data indicative of the routes that may be used in the ITMH or UTMH mode to the nodes of network 100, and control network 100 while the ITMH or UTMH mode is being used to transfer data. The control and configuration mode may also be used by master device 132 for continuously or periodically monitoring the routes between nodes, and for learning the links available in the mesh network topology. According to some embodiments of the invention, master device 132 may utilize routing algorithms and control the network in a way that may implement UTMH mode in a mesh hybrid network. For example, master device 132 may configure selected nodes to communicate with other nodes over only one physical medium out of the plurality of physical mediums available to enable it to retransmit messages with a single bit delay.

The routes generated by master device 132 may be stored in a centralized manner, for example, master device 132 may comprise a storage medium for storing, inter alia, the routes generated by master device 132. Additionally or alternatively, the routes generated by master device 132 may be stored in distributed manner by storage medium of various nodes in network 100. These routes may be constant or dynamically updated according to network 100 specifications and according to occasional events, such as connection failure, addition of new nodes to the network, changing external interference, network load etc.

According to embodiments of the invention, master device 132 may optimize routes to substantially minimize routes delay. For example, section 175 of route 170 connecting node 110 to node 114 via node 112, may be replaced with route 180 connecting node 110 to node 114 via nodes 128 and 130. Route 180 may be longer than section 175, as route 180 contains more interconnecting nodes than the section 175. However, the delay of transmitting a message along route 180 according to embodiments of the invention may be shorter than the delay of transmitting a message along section 175. When transmitting along section 175 node 112 may have to complete receiving the message before node 112 may start resending the message. However, when transmitting a message along route 180, nodes 128 and 130 may retransmit, each with a single bit delay.

According to embodiments of the present invention, nodes may have data indicative of the network topology and available connections stored on storage means associated with that node. As described before, this data may be gathered by a master device. Alternatively, the network topology and available connections data may be distributed between the nodes of the network without a master device, implementing distributed network management. In this case, at least some nodes may have sufficient information to build a tree of routes in the network based on topology of the network and on available interconnection routes or links between the plurality of nodes in the plurality of physical mediums. Embodiments of the present invention are not limited to a specific network management technique.

Figure 2:
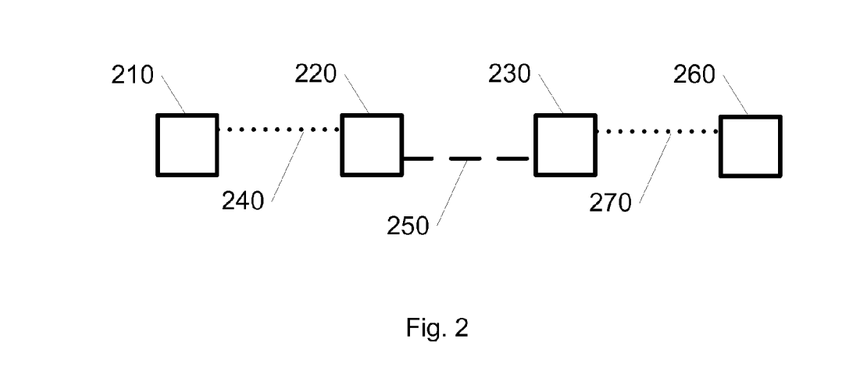
FIG. 2 is a schematic illustration of three nodes pertaining to a mesh hybrid network capable of utilizing improved throughput mode for mesh hybrid communication networks (ITMH mode) or ultimate throughput mode for mesh hybrid communication networks (UTMH mode) according to embodiments of the invention.

Reference is now made to FIG. 2 depicting a schematic illustration of three nodes 210, 220 and 230, out of possibly many nodes (not shown), pertaining to a mesh hybrid network capable of utilizing ITMH or UTMH mode according to embodiments of the invention. The mesh hybrid network may comprise two physical mediums 240, presented by a dotted line and 250, presented by a dashed line. Preceding node 210 may transmit a message, or retransmit a message received from other nodes in the network (not shown) to node 230 via retransmitting node 220. Following node 230 may be the final destination of the message or may retransmit the message to other node along a route, for example, node 260. Node 220 may represent any retransmitting node in the network that may retransmit a message with a single bit delay. Preceding node 210 may represent any preceding node relatively to a retransmitting node with respect to the direction of progress of a message along a route of nodes and following node 230 may represent any following node relatively to a retransmitting node with respect to the direction of progress of a message along the route. Nodes 210 and 230 may be adjacent to node 220. According to embodiments of the present invention, retransmitting node 220 may retransmit a message with a single bit delay if the following UTMH rules are met:

- There is no physical link on any of the physical mediums between preceding node 210 and following node 230, this rule insures that when node 230 retransmits the message, it will not interfere with the transmission of node 210.
- There is a single physical link on one of the physical mediums between preceding node 210 and retransmitting node 220 and a single physical link on other physical medium between retransmitting node 220 and following node 230, this insures that node 230 can receive transmission from node 220 without interference from 210.
- Two nodes in a path with a direct link on a single physical medium do not have any additional direct links on the same physical medium with any other nodes in the path. Thus, even though two nodes along a single path may both transmit in the same time on the same shared medium, there may be no interference. This can happen in real field situation, for example, if the external and physical situation provides isolation between the different communicating areas on the physical medium. For example, a fourth node 260 has a link 270 via physical medium 240 with node 230 only. If node 260 would have had physical links with other nodes in the path via physical medium 240, link 270 could be interfered by other nodes. For example, if node 260 would have had a physical link with node 210 via physical medium 240, link 270 could have been interfered by the transmissions of node 210.

Figure 3:
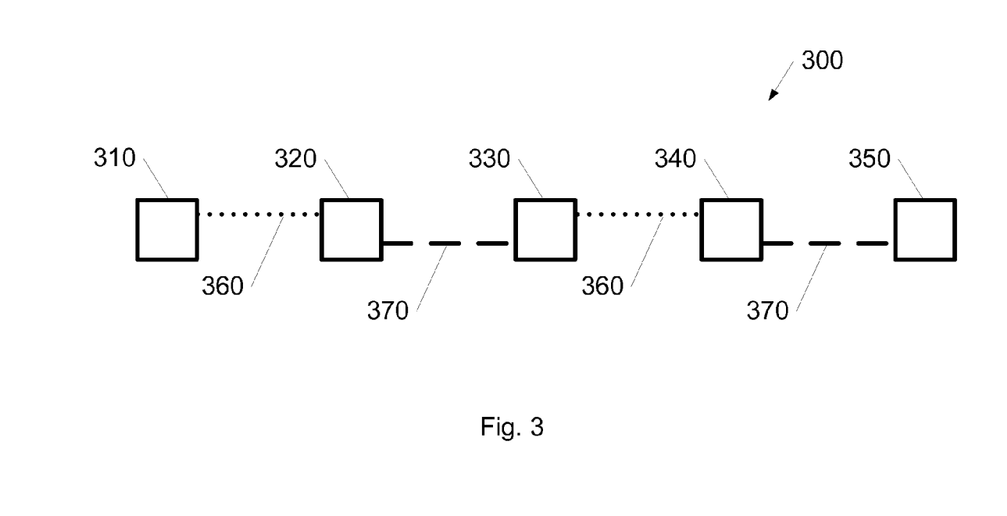
FIG. 3 is a schematic diagram illustrating an exemplary route in mesh hybrid network according to embodiments of the invention.

Reference is made to FIG. 3 depicting a schematic diagram illustrating an exemplary route 300 in a mesh hybrid network according to embodiments of the present invention. Node 310 may be the source node, node 350 may be the destination node, and nodes 320, 330 and 340 may be retransmitting nodes along route 300. Physical mediums 360 and 370 may be two separated physical mediums. It may be apparent that all the retransmitting nodes along route 300 may conform to the UTMH rules specified above with regard to FIG. 2. Specifically, there may be no physical link on any of the physical mediums 360 and 370 between nodes 310 and 330, nodes 320 and 340 and nodes 330 and 350. There may be no direct physical link on physical medium 360 between nodes 310 and 340 and no direct physical link on physical medium 370 between nodes 320 and 350. There may be only a single physical link on one of physical mediums 360 or 370 between each pair of adjacent nodes 310-320, 320-330, 330-340 and 340-350, and each retransmitting node 320, 330 and 340 may have a link with the two adjacent nodes on different physical mediums 360 and 370. Thus, all the retransmitting nodes 320, 330 and 340 in route 300 may retransmit with a single bit delay. Therefore each of retransmitting nodes 320, 330 and 340 in route 300 may contribute a single bit delay to the total delay between nodes 310 and 350. The total delay of route 300 may substantially equal three times a single bit delay. In the general case, in which a route may have M retransmitting nodes, each complying with the UTMH rules, the accumulated delay of the route may substantially equal M times a single bit delay.

Figure 4:
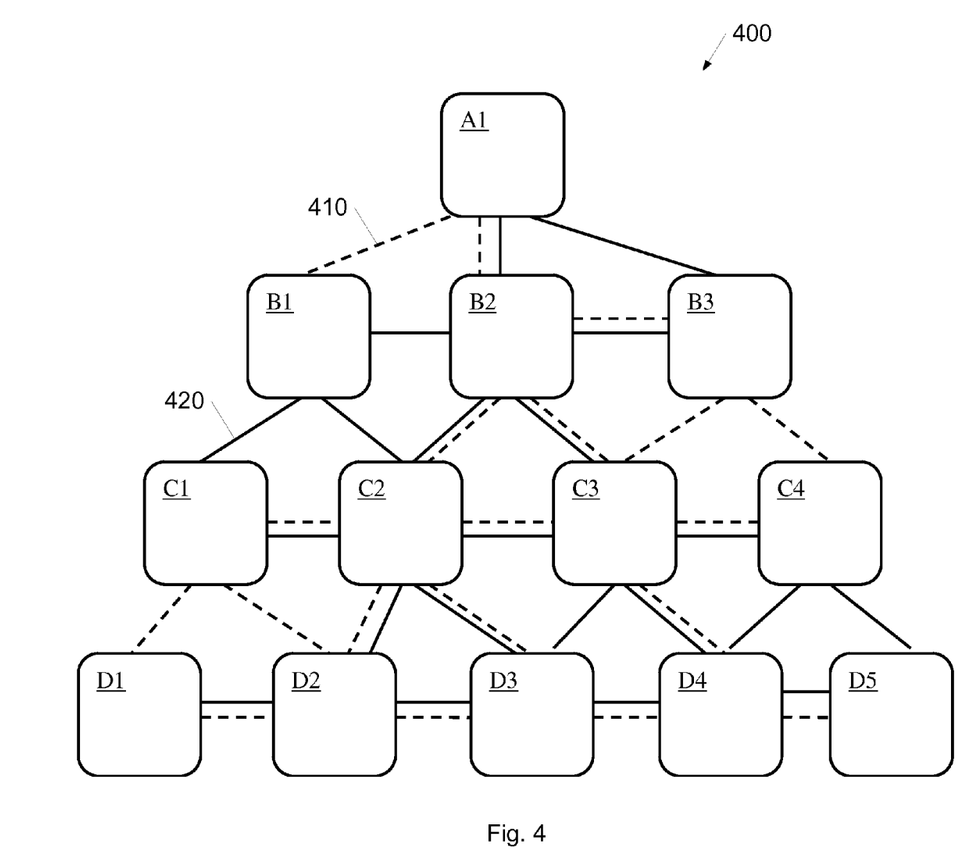
FIG. 4 is a schematic diagram illustrating an exemplary topology of mesh hybrid network which supports UTMH mode according to embodiments of the invention.

Reference is made to FIG. 4 depicting a schematic diagram illustrating an exemplary topology of mesh hybrid network 400 which supports UTMH mode according to embodiments of the invention. According to embodiments of the invention, network 400 may comprise a plurality of nodes A1, B1, B2, B3, C1, C2, C3, C4, D1, D2, D3, D4 and D5 and at least two physical mediums 410 and 420. At least some nodes, for example, B2, C2 and C3 may be adapted to communicate via at least two physical mediums 150 and 160.

Network 400 may support UTMH mode relatively to node A1, thus, predefined routes in a UTMH mode may all originate or end in node A1. Table 1 below lists the possible paths from node A1 to other nodes in the system. It can be seen that each route conforms to the UTMH rules.

TABLE 1

| routes connecting A1 to all other nodes | |
|---|---|
| Destination: | Route: |
| B1 | A1-B1 |
| B2 | A1-B1-B2 |
| B3 | A1-B3 |
| C1 | A1-B1-C1 |
| C2 | A1-B1-C2 |
| C3 | A1-B3-C3 |
| C4 | A1-B3-C4 |
| D1 | A1-B1-C1-D1 |
| D2 | A1-B1-C1-D2 |
| D3 | A1-B3-C3-D3 |
| D4 | A1-B3-C4-D4 |
| D5 | A1-B3-C4-D5 |

As stated before, the accumulated delay of a UTMH route with M retransmitting nodes may substantially equal M times a single bit delay. The term UTMH route may refer to routes in which all of the repeating nodes comply with the UTMH rules and retransmit with a single bit delay. The term regular route may refer to routes in which none of the repeating nodes supports UTMH mode. The delay of a UTMH route may be relatively small comparing to a regular route in cases of UTMH routes with relatively small number of repeating nodes and long messages. However if the transmitted messages are short and the number of repeating nodes in the UTMH routes is large, the total delay of the UTMH route may be large relatively to the delay of a regular route. If, for example, there are two routes connecting a source node with a destination node, the first route being a UTMH route with relatively large number of repeating nodes, and the second route being regular route with relatively small number of repeating nodes, and if the transmitted message is short, the delay of the regular route may be smaller than the delay of the UTMH route. Therefore, if the transmitted messages are short and the network does not limit the routes length, the single bit delays may be taken into account when constructing the routes in the network in order to minimize the delays in the network.

An exemplary method for calculating the best routes in a given network considering the single bit delay according to embodiments of the present invention may be based on an algorithm that solves the shortest route between nodes in a graph problem, while using a unique weight assignment for each link between nodes. That is, solving the problem of finding a path between two vertices (or nodes) such that the sum of the weights of its constituent edges is minimized. The weights of the graph can be set as follows:

i. In each UTMH route the value 1 is assigned to each link in the route.
ii. For all other links in the network the value L will be assigned, where L may be equivalent to the average or maximum message length.

The above weights may guarantee that if the sum of all single bit delays in a UTMH route is less than the delay of regular route with regular retransmissions, the UTMH route may be chosen, and otherwise the shortest regular route may be used.

Building the tree of communication routes may be achieved by solving a single-source shortest route problem for a graph with nonnegative edge route costs. For example, producing a shortest route tree can be based on Dijkstra's algorithm with assigning weights to the possible links according to rules i' and ii' above. Alternatively, other suitable algorithm may be used.

The following calculation may demonstrate the average reduction in the delay of a UTMH mode according to embodiments of the invention in comparison to a standard working mode of a mesh network. An estimation of the total time delay of a message transmitted from a source node to a destination node in a standard, non ITMH or UTMH mode may be calculated as follows:

$$\text{Non UTMH transmission time} = (\text{AccessTime} + TX\text{time}(j)) * \text{Log}_x(N) \quad \text{[equation 1]}$$

Wherein:
N is the number of nodes in the network.
j is the number of bits in the message.
X is the average number of direct connections each node in the network may have.
AccessTime is the time delay of each frame of bits in a message caused by the physical layer; the delay includes the time needed by physical layer to demodulate an incoming bit and modulating it again for retransmission by the second physical layer. For ease of calculations it is assumed that a complete message of j bits may be transmitted in a single frame, therefore this value is considered a constant factor, referred as "single bit delay".
TXtime (j) is the transmission time of j bits over a physical medium. This value includes the actual baud-rate over the line and ignores signal propagation and other substantially negligible delays.
$\text{Log}_x(N)$ is the depth of the network, which is the maximum height of any minimum spanning tree (MST) of the network. MST algorithm may be used to create the default paths topology to nodes in a standard mesh network, by, for example, implementing a greedy search on the tree, as known in the art.

The total time delay of message transmitted from a source node to a destination node in a UTMH mode is calculated as follows:

$$\text{UTMH transmission time} = \text{AccessTime} * \text{Log}_x(N) + TX\text{time}(j) \quad \text{[equation 2]}$$

AccessTime*$\text{Log}_x(N)$ is much smaller than TXtime(j) and TXtime(j)*Log(N) hence it can be ignored. The relation between Non UTMH transmission time and UTMH transmission time may be estimated as:

$$\frac{\text{Non } UTMH \text{ transmission time}}{UTMH \text{ transmission time}} = \frac{TX time(j) * \text{Log}_x(N)}{TX time(j)} = \text{Log}_x(N) \quad \text{[equation 3]}$$

Therefore, the average delay for transmitting messages in UTMH mode according to embodiments of the invention may be reduced by substantially a factor of $\text{Log}_x(N)$ in comparison to a standard mesh network.

According to embodiments of the present invention, the delay of transmitting a whole message along a route in a UTMA mode substantially equals the number of retransmitting nodes times a single bit delay plus TXtime (j). Since typically TXtime (j) may be much larger than the number of retransmitting nodes times a single bit delay, the UTMH mode routing method allows substantially similar access time to each node in the network regardless of the number of retransmissions needed.

Figure 5:
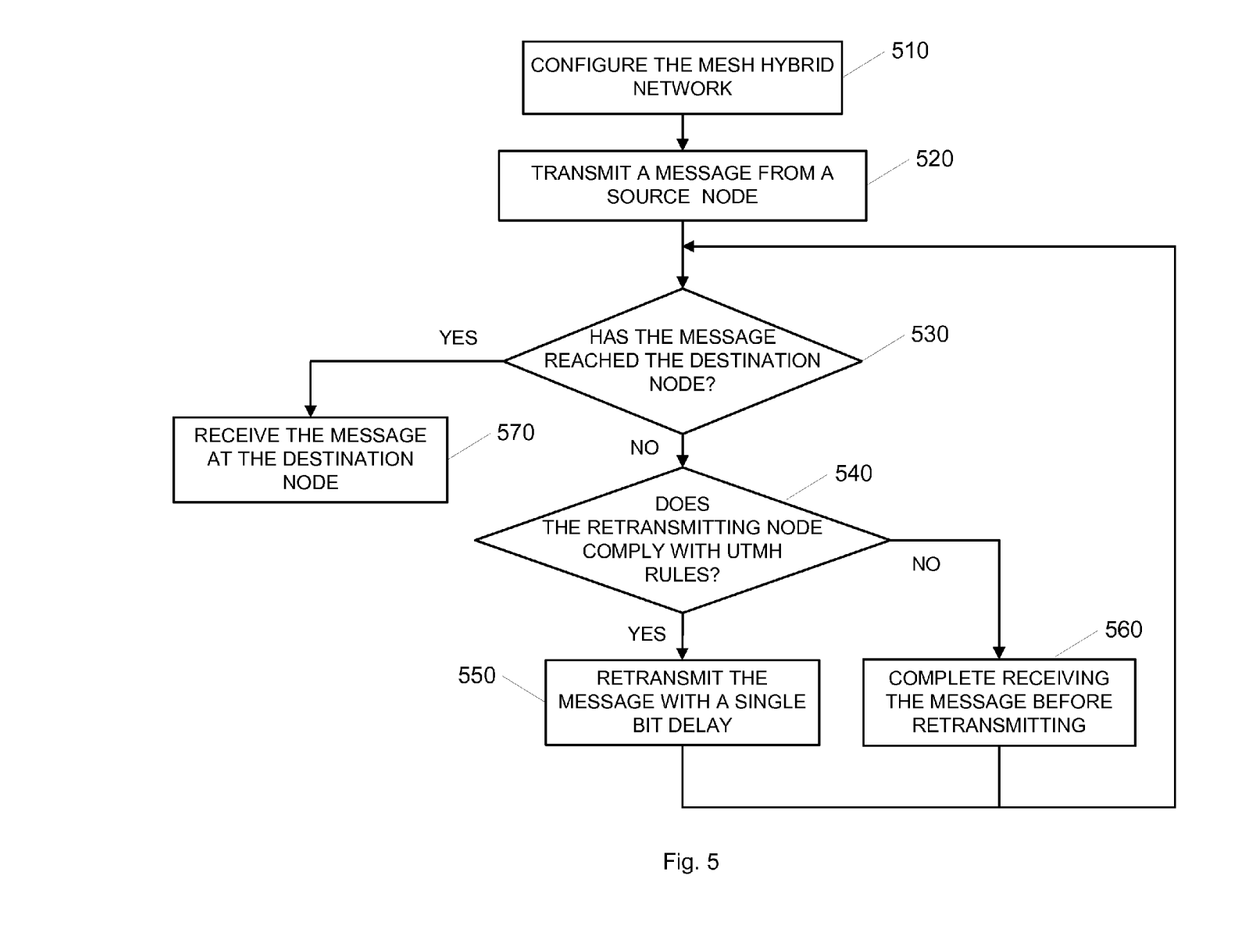
FIG. 5 is a flowchart illustration of a method for implementing ITMH mode according to embodiments of the invention.

Reference is now made to FIG. 5 which is a flowchart illustration of a method for implementing ITMH mode according to embodiments of the invention. According to embodiments of the invention, a mesh hybrid network may be configured to transmit messages in ITMH mode (block 510). Routes may be established and distributed to the network nodes and nodes that may comply with UTMH rules may be configured to retransmit messages with a single bit delay. A message may be sent from a source node (block 520). If the next node in the route is not the destination node (block 530), then the next node may be a retransmitting node. In block 540 it may be checked whether the retransmitting node comply with the UTMH rules. If the retransmitting node does not comply with the UTMH rules, then the retransmitting node may have to complete receiving the message before retransmitting the message (block 560). If, however, the retransmitting node does comply with the UTMH rules, then the retransmitting node may retransmit the message with a single bit delay on a different physical medium (block 550). When the message reaches the destination node it may be received by the destination node (block 570).

Figure 6:
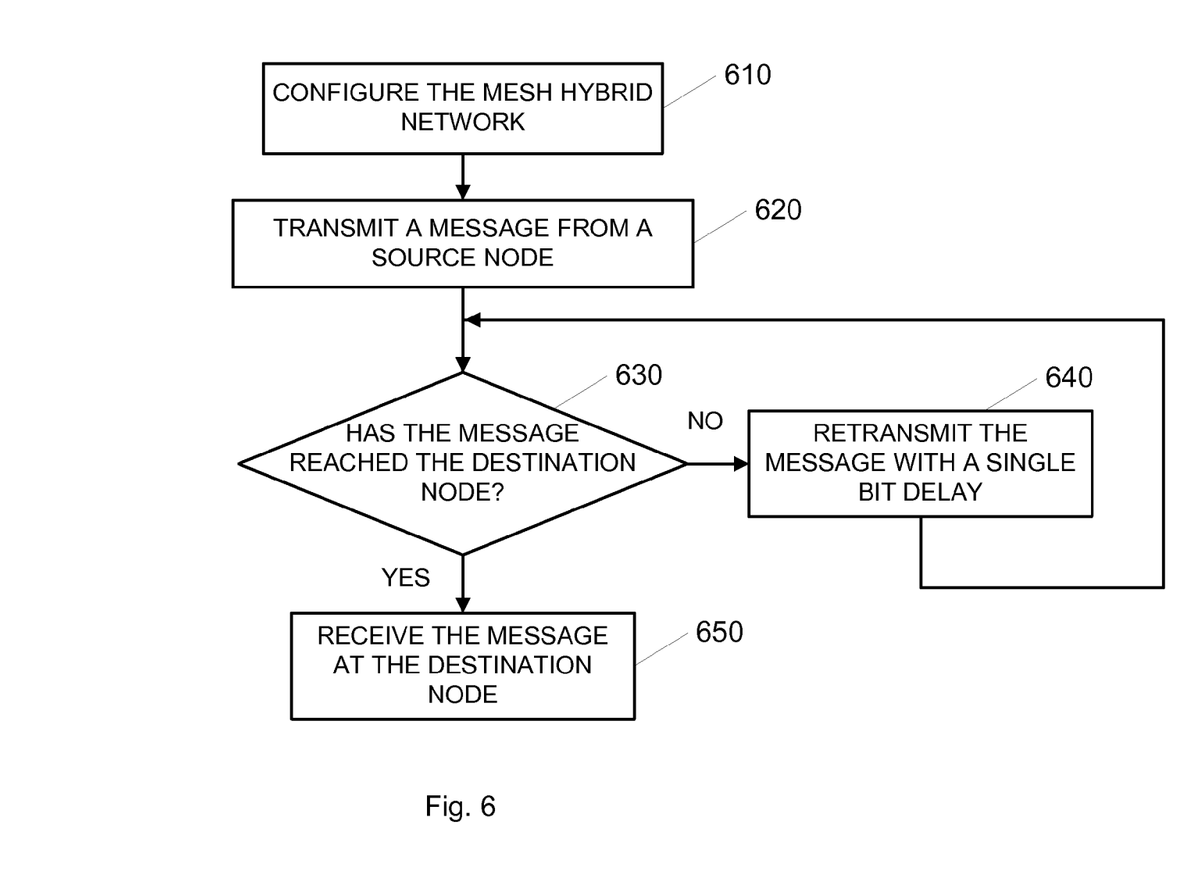
FIG. 6 is a flowchart illustration of a method for implementing UTMH mode according to embodiments of the invention.

Reference is now made to FIG. 6 which is a flowchart illustration of a method for implementing UTMH mode according to embodiments of the invention. According to embodiments of the invention, a mesh hybrid network may be configured to transmit messages in UTMH mode (block 610). Routes may be established that may comply with the UTMH rules. These routes may be distributed to the network nodes. It may be needed to configure network connections between nodes on the different physical mediums so that retransmitting nodes may comply with the UTMH rules. A message may be sent from a source node (block 620). If the next node in the route is not the destination node (block 650), then this node may be a retransmitting node. Retransmitting nodes may retransmit messages along the routes with a single bit delay (block 640). When the message reaches the destination node it may be received by the destination node (block 640).

Some embodiments of the present invention may be implemented in software for execution by a processor-based system, for example, master device 132. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A hybrid mesh network, the network comprising:
two different types of shared physical mediums; and
a plurality of nodes linked over said physical mediums to form at least one ultimate throughput mesh hybrid (UTMH) route comprising a plurality of retransmitting nodes, each linked over a first physical medium with a corresponding first node and over a second physical medium with a corresponding second node, and each configured to start retransmitting a message received over one of the physical mediums over the other physical medium before completing receiving the message;
wherein there is no link on any of said physical mediums between said first node and said second node, and
wherein each two nodes of said at least one UTMH route which are linked on one of said physical mediums do not have any links on the same physical medium with any other of said nodes in said at least one UTMH route.

2. The network of claim 1, wherein said retransmitting nodes are configured to start retransmitting a message received from said first node over said first physical medium to said second node over said second physical medium before completing receiving the message.

3. The network of claim 1, wherein said nodes to build a tree of said at least one UTMH route in the network based on topology of the network and on available links in the two separate physical mediums between the nodes.

4. The network of claim 1, further comprising:
a master device to build a tree of said at least one UTMH route in the network based on topology of the network and on available links in the two separate physical mediums between the nodes and to communicate data indicative of the tree to the nodes.

5. The network of claim 1, wherein routes are to be calculated by:
assigning a weight of 1 to each link in each of said at least one UTMH route;
assigning a weight equivalent to average message length to all other links in the network; and
solving a single-source shortest route problem for a graph with nonnegative edge route costs.

6. A method for high throughput communication in a mesh hybrid network comprising two different types of shared physical mediums and a plurality of nodes, the method comprising:
linking a plurality of retransmitting nodes, each with a corresponding first node over a first physical medium and with a corresponding second node over a second physical medium to form at least one ultimate throughput mesh hybrid (UTMH) route, wherein each of said retransmitting nodes is configured to start retransmitting a message received over one of the physical mediums over the other physical medium before completing receiving the message
wherein there is no link on any of said physical mediums between said first node and said second node, wherein each two nodes of said at least one UTMH route with a link on one of said physical mediums do not have any links on the same physical medium with any other of said nodes in said at least one UTMH route.

7. The method of claim 6, comprising:
start retransmitting a message received from said first node over said first physical medium to said second node over said second physical medium before completing receiving the message.

8. The method of claim 6, comprising:
building a tree of said at least one UTMH route in the network based on topology of the network and on available links in the two separate physical mediums between the nodes; and
communicating data indicative of the tree to the nodes.

9. The method of claim 6, comprising:
assigning a weight of 1 to each link in each of said at least one UTMH route;
assigning a weight equivalent to average message length to all other links in the network; and
solving a single-source shortest route problem for a graph with nonnegative edge route costs.

10. The network of claim 1, wherein said first physical medium is power line communication (PLC) physical medium and said second physical medium is a radio frequency (RF) physical medium.

11. The method of claim 6, wherein said first physical medium is power line communication (PLC) physical medium and said second physical medium is a radio frequency (RF) physical medium.

* * * * *